Aug. 12, 1969  R. W. BENSON ETAL  3,461,302
DEVICE FOR SENSING THE EDGES OF WEBS OF VARYING TRANSPARENCIES
Filed May 9, 1966
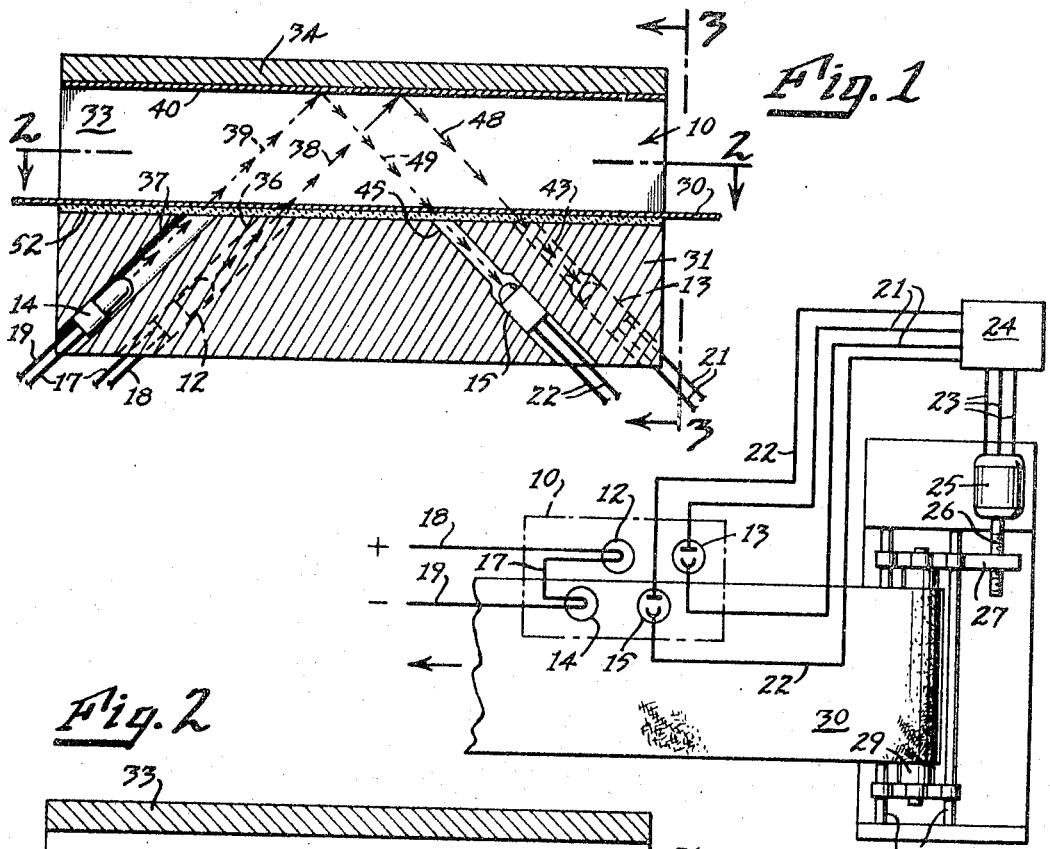
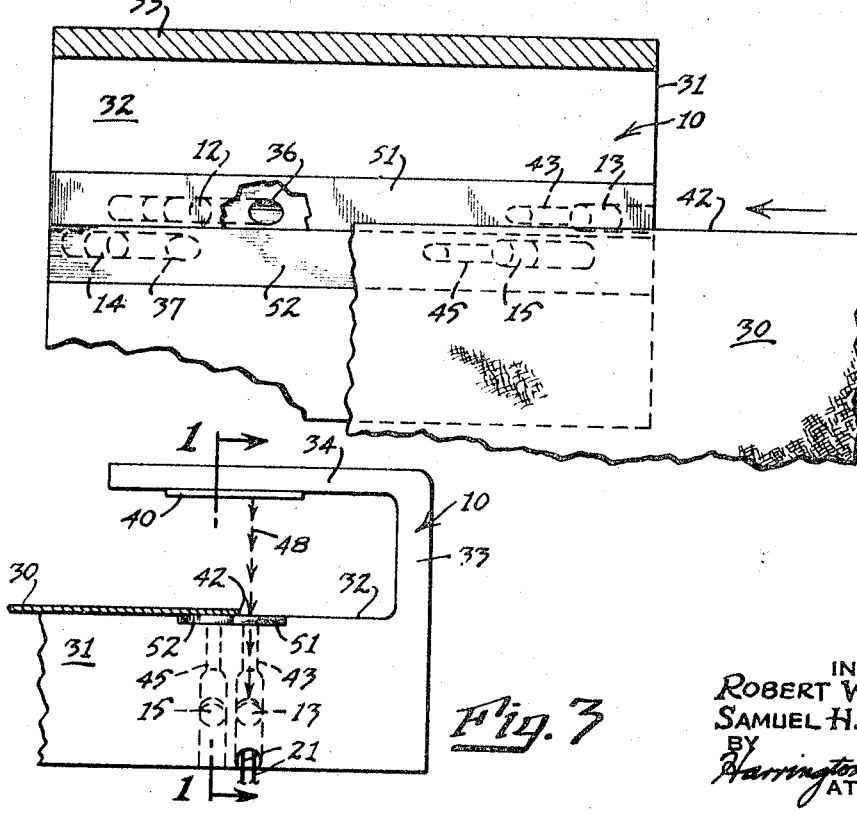
INVENTORS:
ROBERT W. BENSON
SAMUEL H. PEARSALL, JR.
BY
Harrington A. Lackey
ATTORNEY

United States Patent Office 3,461,302
Patented Aug. 12, 1969

3,461,302
DEVICE FOR SENSING THE EDGES OF WEBS OF VARYING TRANSPARENCIES
Robert W. Benson, Nashville, and Samuel H. Pearsall, Jr., Donelson, Tenn., assignors to Bonitron, Inc., Nashville, Tenn., a corporation of Tennessee
Filed May 9, 1966, Ser. No. 548,612
Int. Cl. G01n 21/30
U.S. Cl. 250—219          5 Claims

ABSTRACT OF THE DISCLOSURE

A device for sensing the edge of a web including a pair of light sources and a pair of photocells on one side of the plane of the web, and a light reflective surface on the opposite side of the web, one light source and photocell being located in an interior light plane so that the light source projects a collimated light beam at an acute angle through the web plane against the light surface, the reflective beam being received by the corresponding photocell, the other light source and photocell being located in an exterior light plane, the light source projecting a collimated light beam at the same acute angle through the web plane against the reflective surface, the reflected beam being received by the other corresponding photocell, in the absence of a web, and apparatus adapted to shift the lateral position of the web in response to the signals transmitted by the photocells.

---

This invention relates to a device for sensing the edge of a web or sheet, and more particularly to a device for sensing the edge of webs or sheets of varying transparencies.

Although the prior art is replete with numerous types of edge sensing devices for controlling and maintaining the longitudinal edge of a moving web along a predetermined line or course, many of which devices are photoelectrically energized, nevertheless such edge sensing devices are not adapted to sense webs of sheet material of varying transparencies.

It is therefore an object of this invention to provide an edge sensing device which will sense the longitudinal edge of webs of various transparencies without adjustment.

Another object of this invention is to provide a photoelectric device for sensing the edge of sheet materials which are transparent to the normal incidence of light, by rendering such materials opaque to the light signal of the device.

A further object of this invention is to provide a photoelectric edge sensing device in which the light beam from the light source is directed at an acute angle to the plane of the web.

Another object of this invention is to provide a photoelectric edge sensing device in which the beam from the light source is projected to intersect the plane of the web material twice.

Another object of this invention is to provide a photoelectric edge sensing device incorporating a light source and a photoelectric cell mounted on one side of the web and a reflective surface on the other side of the web, so that in the absence of the web, the light beam from the light source will be reflected by the reflective surface toward the photoelectric cell for energization thereof, yet the angular dispositions of the light source and cell are such that the web material will be opaque to either or both the incident and reflected light beams regardless of the transparency of the web material to normal incident light.

A further object of this invention is to provide a photoelectric edge sensing device incorporating an outside sensor unit including a light source and a photoelectric cell and an inside sensor unit including a light source and photoelectric cell, located respectively outside and inside the normal position of the longitudinal edge of the web, and inside and outside transparent strips for respectively intercepting the outside and inside light beams, the transparent strips being polarized with axes 90° apart.

A further object of this invention is to provide a photoelectric edge sensing device including inside and outside photoelectric sensor units longitudinally staggered on opposite sides of the normal longitudinal position of the web edge in order to minimize the "dead zone" between the sensor units.

Further objects and advantages of the invention will be apparent from the following description taken in conjunction with the drawings, wherein:

FIG. 1 is a longitudinal sectional elevation of a sensing head made in accordance with this invention taken along the line 1—1 of FIG. 3; and showing the projection of the inside light beam in phantom;

FIG. 2 is a fragmentary section taken along the line 2—2 of FIG. 1, with the web edge in normal position;

FIG. 3 is a rear end elevation of the sensing head taken along the line 3—3 of FIG. 1 showing the web in section; and FIG. 4 is a schematic plan view and electrical diagram of the sensing head and the means for laterally shifting the web.

Referring now to the drawings in more detail, and particularly to FIG. 4, the edge sensing head 10 is shown schematically incorporating an outside sensor unit including the outside light source 12 and an outside photoelectric cell 13, and an inside sensor unit including an inside light source 14 and an inside photoelectric cell 15. The light sources or lamps 12 and 14 are shown connected in series by a connecting lead 17 and power supply leads 18 and 19 connected to any source of electrical energy, not shown. The outside photoelectric cell 13 and the inside photoelectric cell 15 are connected in their respective electrical circuits 21 and 22 to an electrical control box 24, which in turn controls the electrical reversible motor 25 through leads 23. Motor 25 reversibly drives motor shaft 26 which threadedly engages yoke 27 to reciprocably move the yoke along guide rods 28. Rotatably mounted upon yoke 27 is web roll 29 carrying the web 30, such as a sheet of fabric or cloth. Thus, the web 30 may be laterally moved inwardly or outwardly by the yoke 27 reversibly driven by the threaded motor shaft 26, as the reversible motor 25 is energized in one direction or the other, depending upon the electrical signals received in the electrical control box 24.

The edge control system generally described above with reference to FIG. 4 is not new.

However, the construction of the sensing head 10 and the arrangement of the light sources 12 and 14 and photoelectric cells 13 and 15, as disclosed in FIGS. 1–3, constitute this invention.

The sensing head 10 comprises a lower block 31 which is opaque to light, having a flat upper surface 32 for receiving the passage of the web 30. The left end of the block 31 may extend as far as desired for supporting the web 30, and its right end perferably forms an upstanding wall 33 for supporting an upper member or flange 34 extending inwardly over the web 30.

Formed in the block 31 are elongated cavities 36 and 37 for receiving the outer lamp 12 and inner lamp 14, respectively, in fixed positions for directing corresponding incident light beams 38 and 39 upwardly and at an acute angle to the plane of the web 30. The incident light beams 38 and 39 are directed toward a reflective surface, such as mirror 40, supported on the bottom of flange 34 parallel to the plane of the web 30 carried by surface 32. It will also be noted, particularly in FIG. 2, that the cavities 36 and 37 are located on opposite sides of a vertical plane containing the longitudinal edge 42 of the web 30 in its normal position.

In a similar manner, cavities 43 and 45 are formed in block 31 for respectively receiving in fixed position the outer photoelectric cell 13 and the inner photoelectric cell 15. Cavities 43 and 45 are also elongated and directed upwardly at acute angles so that the respective reflected beams 48 and 49, reflected by the mirror 40 from the incident beams 38 and 39, will project through the corresponding cavities 43 and 45 to energize the respective photoelectric cells 13 and 15 when either or both the incident and reflected beams are not blocked by the opacity of the web 30. As best disclosed in FIG. 2, the photocell cavities 43 and 45 are also located upon the opposite sides of the vertical plane containing the longitudinal edge 42 in its normal position.

Furthermore, the axes of the outer cavities 36 and 43 are coplanar, being located in an outer light plane parallel to the normal position of the longitudinal edge 42, and preferably perpendicular to the surface 32 and the web 30 carried by the surface 32. In a similar manner the axes of the cavities 37 and 45 are also coplanar, being located in an inner light plane parallel to, but on the inside of, the normal position of the longitudinal edge 42. Thus, as best disclosed in FIGS. 2 and 3, when the longitudinal edge 42 of the web 30 is in its normal position or course, the web 30 will intercept the inner light beams 39 and 49 shown in phantom in FIG. 1, but will not intercept the outer light beams 38 and 48. If the web 30 is opaque to either of the inner light beams 39 or 49, then the inner photocell 15 will be de-energized, while the outer photocell 13 will be energized.

The electrical controls in the box 24 are so constructed that as long as the photocell 15 is de-energized and the photocell 13 is energized, the reversible motor 25 will remain deenergized to maintain the yoke 27 and web roll 29 laterally stationary. However, should the longitudinal edge 42 drift inwardly inside the inner light plane, the inner light beam 39 will project upon the mirror 40 and be reflected as the reflected light beam 49 to energize the photocell 15. Thus, with both photocells 13 and 15 energized, the electrical controls 24 will energize the reversible motor 25 to drive the yoke 27 and web roll 29 outwardly until the normal course of the edge 42 is restored and the web 30 again covers the light source 14 and photocell 15.

In a similar manner, if the longitudinal edge 42 drifts outwardly outside the outer light plane to cover the light source 12 and photocell 13, the outer light beams 38 and 48 will be interrupted to de-energize the photocell 13. With both photocells 13 and 15 de-energized, the electrical controls 24 will be actuated to reverse the motor 25 and move the yoke 27 and web roll 29 inwardly until the normal position of the longitudinal edge 42 is restored and the photocell 13 is re-energized to stop the motor 25.

One of the most important features of this invention is the projection of the incident light beams 38 and 39 at an actuate angle to the plane of the web 30. As the acuteness of the angle between the web 30 or web support surface 32 and the incident light beam 39 or 38 is reduced, the opacity of the web 30 is increased. Thus where it is desired to sense the edge 42 of a material 30, such as cellophane, having a high degree of transparency for normal incidence of light, such material will be opaque if the angle between the light beam and web material is small enough. By mounting the lamps 12 and 14 at an acute angle which will render opaque the material to be handled having the highest transparency, further adjustments of the sensing elements in the sensing head 10 are unnecessary. For example, if the lamps 12 and 13 are set at an angle, such as approximately 45° in FIG. 1, to accommodate and render opaque thin netting, then not only the thin netting may be fed and sensed by the sensing head 10, but also denser materials, such as poplin, broadcloth, silk and paper.

Another important feature of this invention is to project a beam of light from each light source 12 and 14 through the plane of the web material 30 twice before the beam is receive dand sensed by the photocells 13 or 15. To this end, both light sources 12 and 14 and photocells 13 and 15 are mounted on the same side of the web 30, the longitudinal axes of the lamp cavities and photocell cavities being directed at angles to each other upwardly and converging to a point on the opposite side of the web 30. At this point of convergence, a reflective surface, such as the mirror 40, is located to receive and project the beams from the light source back through the web plane into the photocells 13 and 15, respectively. Thus, even if an incident light beam, such as 39, pass through a relatively thin web material 30, the beam will be sufficiently refracted or diffused, so that it will not pass through the portion of the web material 30 aligned with the appropriate photocell cavity 43 or 45. Furthermore, the resultant deflection of the incident beam on the mirror 40 will be approximately doubled in the reflected beam projected to the level of the corresponding photocell.

In order to improve the accuracy of the edge sensing device made in accordance with this invention, and particularly to minimize the "dead zone" between the inner and outer light planes, transparent polarized strips 51 and 52 having axes of polarization 90° to each other are fixed longitudinally upon the top surface of the block 32 parallel to each other and intercepting their respective inner and outer light planes. Thus, the oppositely polarized strips 51 and 52 prevent any diffused light emitted by one lamp from being received by both photocells, and thus permits closer lateral positioning of both inner and outer lights and cells.

In order to further minimize the "dead zone," or zone of lateral edge movement without actuating the motor 25, and render the sensing device more sensitive, the lights 12 and 14 may be longitudinally staggered with respect to each other, as best disclosed in FIGS. 1 and 2. The photocells 13 and 15 are also longitudinally staggered in a corresponding manner, as disclosed in FIGS. 1 and 2, in order to receive the staggered reflected beams 48 and 49.

In actual practice upon a cloth spreading machine, the lateral deviation of the longitudinal edge 42 of the cloth 30 has been controlled within one-eighth of an inch because of the staggered locations of the lamps 12 and 14 and the photocells 13 and 15, as well as the employment of the polarized strips 51 and 52. However, it is not desirable to have the "dead zone" so narrow that mere irregularities in the cloth edge will cause constant lateral motion of the web roll 29 and the web 30.

An incidental advantage to this construction of the sensing head 15 is that all of the sensing units, namely the lamps 12 and 14 and the photocells 13 and 15, together with their respective leads 17, 18, 19, 21 and 22 are all located on the same side, that is, below the web 30, while the only element located above the web 30 is the stationary and non-electric mirror 40.

It will be apparent to those skilled in the art that various changes may be made in the invention without departing from the spirit and scope thereof, and therefore the invention is not limited by that which is shown in the drawings and described in the specification, but only as indicated in the appended claims.

What is claimed is:

1. A device for sensing the longitudinal edge of a substantially transparent web comprising:

(a) a carriage supporting said web in a web plane for longitudinal movement substantially parallel to said edge, (b) means for shifting said carriage laterally, inwardly or outwardly of a normal edge position,
(c) an outer elongated beam cavity on one side of and opening toward said web plane, and having a longitudinal axis intersecting said web plane at an acute angle and in an outer light plane outside of and parallel to a plane containing said normal edge position,
(d) an outer light source mounted within said outer beam cavity to direct an outer incident beam through the opening of and parallel to the longitudinal axis of said outer cavity,
(e) an inner elongated beam cavity on said one side of and opening toward said web plane, and having a longitudinal axis intersecting said web plane at the same acute angle as the longitudinal axis of said outer cavity and in an inner light plane inside of and parallel to a plane containing said normal edge position,
(f) an inner light source mounted within said inner beam cavity to direct an inner incident beam through the opening of and parallel to the longitudinal axis of said inner cavity,
(g) the value of said acute angle being such that the most transparent web to be sensed by said device in said web plane is opaque to said incident light beams,
(h) an outer photoelectric cell,
(i) an inner photoelectric cell,
(j) a planar light reflective surface,
(k) means mounting said reflective surface on the other side of said web plane to intercept said outer and inner incident beams and to direct outer and inner reflective beams back through said web plane in said respective light planes,
(l) means mounting said outer photoelectric cell on said one side of said web plane in said outer light plane for receiving said outer reflected beam,
(m) means mounting said inner photoelectric cell on said one side of said web plane in said inner light plane for receiving said inner reflected beam, and
(n) means operatively connecting said photoelectric cells to said shifting means to move said carriage laterally to maintain said longitudinal edge substantially in said normal edge position.

2. The invention according to claim 1 further comprising an outer strip of transparent polarized material mounted longitudinally in said outer light plane, and an inner strip of transparent polarized material having axes of polarization 90° to said outer polarized strip and mounted longitudinally in said inner light plane.

3. The invention according to claim 1 in which said outer light source and said outer photoelectric cell are longitudinally staggered with respect to said inner light source and said inner photoelectric cell.

4. The invention according to claim 1 in which said acute angle is approximately 45°.

5. The invention according to claim 1 further comprising an opaque block having a flat surface for receiving said web in said web plane, said beam cavities being located in said block and opening through said flat surface.

References Cited

UNITED STATES PATENTS

| 2,810,316 | 10/1957 | Snyder | 250—219 X |
| 2,947,212 | 8/1960 | Woods | 88—14 |
| 3,108,727 | 10/1963 | Farber | 250—219 X |
| 3,202,828 | 8/1965 | Chen | 250—225 |
| 3,232,547 | 2/1966 | Thiede et al. | 250—219 X |

WALTER STOLWEIN, Primary Examiner

U.S. Cl. X.R.

356—172